March 20, 1962 — L. E. MULLER — 3,025,716
LUBRICANT CONTROL MEANS
Filed Sept. 24, 1959 — 2 Sheets-Sheet 1
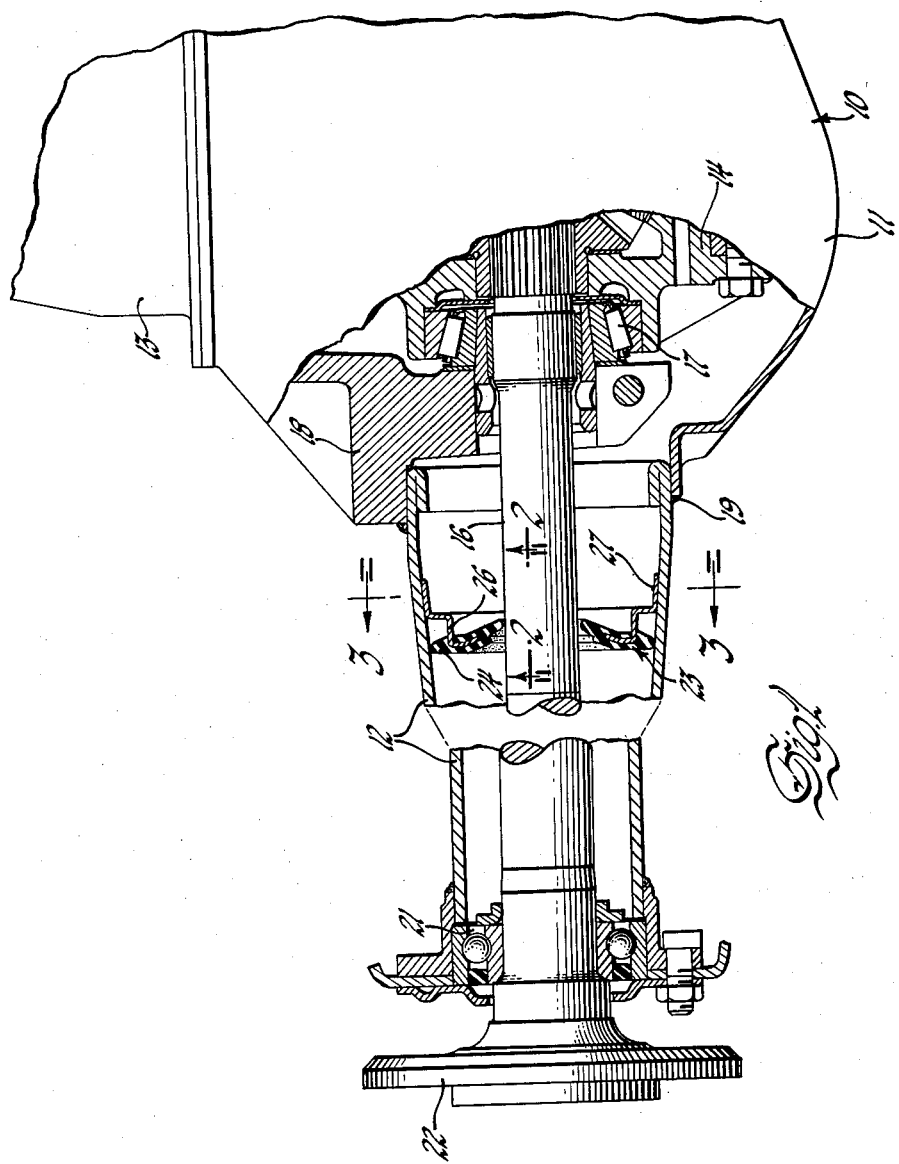
INVENTOR.
Lloyd E. Muller
BY
L. D. Burch
ATTORNEY

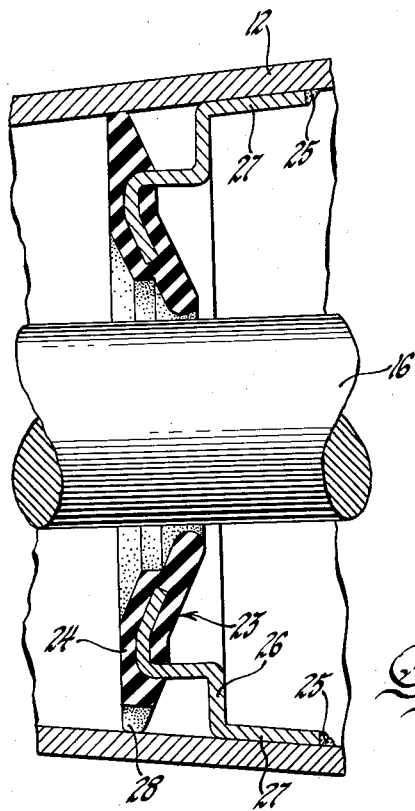
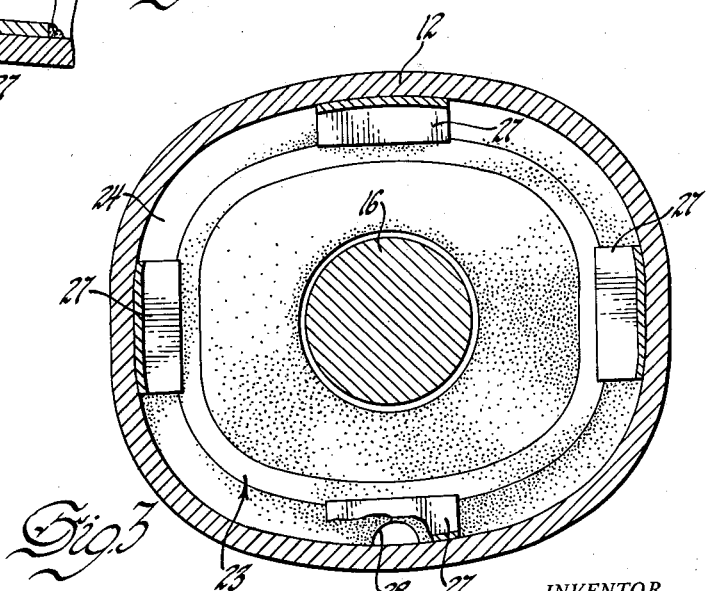

United States Patent Office 3,025,716
Patented Mar. 20, 1962

3,025,716
LUBRICANT CONTROL MEANS
Lloyd E. Muller, Flint, Mich., assignor to General Motors Corporation, Detroit, Mich., a corporation of Delaware
Filed Sept. 24, 1959, Ser. No. 841,973
3 Claims. (Cl. 74—607)

This invention relates to motor vehicle drives, particularly to rear axle drives where there is a tendency for the lubricating oil to flow outwardly by centrifugal force resulting from cornering at high speeds.

It is proposed to provide lubricant control means in the drive axle of a motor vehicle to limit the extent to which the lubricating oil may flow out of the differential and into the axle housing at each end of the differential and to meter the oil beyond the means to lubricate the bearings at the ends of the axle housings.

In the drawings:

FIGURE 1 is a fragmentary plan view of a rear axle of a motor vehicle with parts of the structure broken away and shown in cross section to better illustrate the interior of the structure.

FIGURE 2 is an enlarged fragmentary vertical cross sectional view of the structure shown by FIGURE 1. FIGURE 2 is taken substantially in the plane of line 2—2 on FIGURE 1, looking in the direction of the arrows.

FIGURE 3 is an enlarged vertical cross sectional view of the structure shown by FIGURES 1 and 2. FIGURE 3 is taken substantially in the plane of line 3—3 on FIGURE 1, looking in the direction of the arrows thereon.

The vehicle drive 10 embodying the invention includes a differential housing 11 having axle housings 12 projecting in opposite directions therefrom and a drive line housing 13 projecting forwardly of the differential housing and normal to the axle housings 12. The drive line housing 13 may contain a propeller shaft adapted to drive a differential 14 contained within the differential housing and having axles 16 projecting outwardly in opposite directions therefrom. The differential 14 is mounted at each end in roller bearings 17 supported at the ends 18 of the differential housing from which the axles 16 project. The axle housings 12 are welded or otherwise secured in the differential housing ends 18 as is indicated at 19. The outer ends of the axles 16 are mounted in the outer ends of the axle housings 12 in bearings 21. Beyond the bearings 21 the axles 16 terminate in flanges 22 on which the wheels of the vehicle may be secured in any suitable manner.

It is customary to partly fill the differential housing 11 with relatively viscous oil into which the rotated parts of the differential 14 may be partly immersed to throw the oil around in the housing to cause the different parts of the differential to be lubricated. Some of this oil will be thrown outwardly into the axle housings and will move along the axle housings to lubricate the bearings 21 supporting the shaft 16 at the ends of the housing.

It has often happened when going around corners at high speed that this thick lubricating oil will be thrown into the outer ends of the axle housings by centrifugal force and will practically fill the outer ends of the axle housing. Since the oil is very thick it may stay in the outer end of the axle housings for a considerable time, particularly if the weather is cold or the vehicle has not been run until the oil warms up enough to flow easily. Under such conditions the differential and the bearings supporting the differential and the bearing at the outer end of the inner one of the axles have been compelled to run at excessive speed without proper lubrication and have been sometimes damaged to such an extent that the parts have to be serviced or even replaced.

In order to prevent this it is proposed to provide lubricant controlling means in each axle housing such as that indicated at 23. Such lubricant controlling means may take the form of a rubber or other suitable resilient ring 24 which may be large enough to tightly engage the axle housings a short distance from the differential housing 11. The inner surfaces of the rings may be somewhat larger than the axles 16 to provide clearances if this is desirable. The rings may be supported in the housing by collars 26 that may be embedded in the rings and that may have legs or supports 27 projecting outwardly therefrom and which may be welded or otherwise secured at 25 to the housings as is indicated at 27. In the present instance the housings are somewhat rectangular in configuration so that the controlling means may be thrust into the inner ends of the housings before they are assembled on the differential housings and may be turned around about 45° into the position shown in FIGURE 3.

In order to provide sufficient lubrication for the bearings 21 supporting the outer end of the axles it is proposed to provide a notch or notches 28 between the rings 24 and the lower surfaces of the axle housings, to permit limited amounts of lubricating oil to flow inwardly and outwardly through the notches. Such limited amounts of lubricating oil will be sufficient for lubricating the bearings 21. But, the notches will not be large enough to permit enough of the oil to flow into the outer ends of the housings so that the differential may not be properly lubricated. Ordinarily when cornering at high speeds, the lubricating oil will simply flow outwardly against the control means 21 where it will remain until the vehicle is again proceeding on a straight part of the road. The oil then will flow by gravity into the differential housing where it will continue to properly lubricate the differential.

I claim:

1. A motor vehicle drive including a differential housing and an axle housing, a differential rotatably mounted in said differential housing, an axle driven by said differential and rotatably mounted in said axle housing and projecting outwardly from said differential and through said axle housing, bearing means rotatably mounting said differential in said differential housing, bearing means rotatably mounting the outer end of said axle in the outer end of said axle housing, and means controlling the lubrication of said differential and said axle and said bearing means for said differential and said axle and including a resilient ring through which said axle projects and which engages the inner peripheral surface of said axle housing, means mounting said ring in said axle housing between said differential and said shaft bearing means and adjacent said differential for controlling the lubricant for said differential and for retaining said lubricant mostly in said differential housing and substantially preventing said lubricant from being thrown outwardly into the outer end of said axle housing by centrifugal force resulting from cornering said vehicle, said ring closely fitting said axle housing to prevent the flow of lubricant outwardly between said ring and said housing and being closely positioned around said shaft to substantially prevent the flow of lubricant outwardly between said ring and said shaft, and a notch formed between the lower edge of said ring and said axle housing and permitting a limited flow of said lubricant inwardly and outwardly in the lower part of said axle housing for lubricating said shaft bearing means.

2. A motor vehicle drive including a differential housing and an axle housing, a differential rotatably mounted in said differential housing, an axle driven by said differential and rotatably mounted in said axle housing and projecting outwardly from said differential and through said axle housing, bearing means rotatably mounting said differential in said differential housing, bearing means rotatably mounting the outer end of said axle in the outer end of said axle housing, and means controlling the lubrication of said differential and said axle and said bearing means for said differential and said axle and including a resilient ring through which said axle projects and which engages the inner peripheral surface of said axle housing, means mounting said ring in said axle housing between said differential and said shaft bearing means and adjacent said differential for controlling the lubricant for said differential and for retaining said lubricant mostly in said differential housing and substantially preventing said lubricant from being thrown outwardly into the outer end of said axle housing by centrifugal force resulting from cornering said vehicle, said ring mounting means embracing a collar embedded in said ring and having securing means projecting outwardly therefrom for welding or otherwise securing said controlling means to said axle housing, said ring closely fitting said axle housing to prevent the flow of lubricant outwardly between said ring and said housing and being closely positioned around said shaft to substantially prevent the flow of lubricant outwardly between said ring and said shaft, and a notch formed between the lower edge of said ring and said axle housing and permitting a limited flow of said lubricant inwardly and outwardly in the lower part of said axle housing for lubricating said shaft bearing means.

3. A seal assembly for use between a rotating shaft and a housing enclosing said shaft and comprising a resilient seal member adapted to be disposed between said housing and said shaft and closely engaging said housing, an annular collar embedded in said seal member and extending outwardly and exteriorly of said seal member, a plurality of legs extending from spaced points about the periphery of said collar and in a generally axial direction, said legs being adapted to closely engage said housing and be secured thereto, and fluid passage means formed in said seal member and at the outer periphery thereof to permit a limited amount of lubricant to pass said seal member in either direction when said seal assembly is mounted in said housing.

References Cited in the file of this patent

UNITED STATES PATENTS

| | | |
|---|---|---|
| 1,230,450 | Vincent | June 19, 1917 |
| 1,966,434 | Barker | July 17, 1934 |
| 2,342,092 | Scribner | Feb. 15, 1944 |
| 2,439,521 | Miller | Apr. 13, 1948 |
| 2,587,405 | Stevens et al. | Feb. 26, 1952 |
| 2,743,950 | Helfrecht et al. | May 1, 1956 |
| 2,755,113 | Baumheckel | July 17, 1956 |
| 2,867,462 | Nielsen | Jan. 6, 1959 |
| 2,926,938 | Ratti | Mar. 1, 1960 |